W. A. WILEY.
VALVE.
APPLICATION FILED FEB. 9, 1916.
1,247,048.
Patented Nov. 20, 1917.
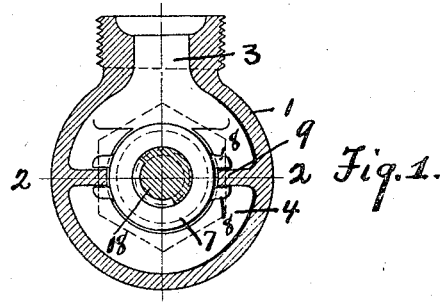
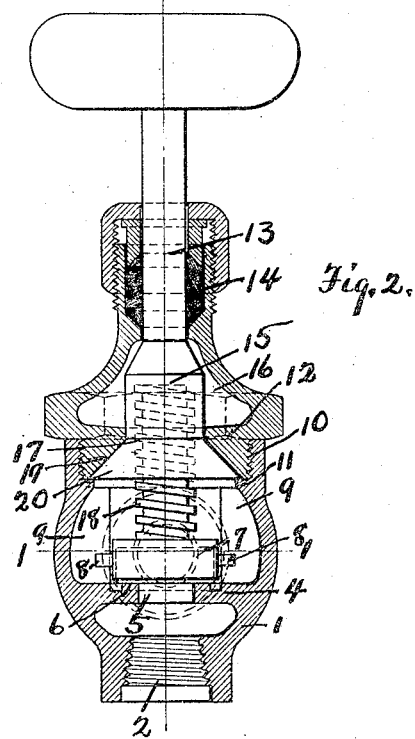
Inventor
William A. Wiley
By
Attorney

UNITED STATES PATENT OFFICE.

WILLIAM A. WILEY, OF ERIE, PENNSYLVANIA, ASSIGNOR TO AMERICAN STERILIZER COMPANY, OF ERIE, PENNSYLVANIA, A CORPORATION OF PENNSYLVANIA.

VALVE.

1,247,048.    Specification of Letters Patent.    Patented Nov. 20, 1917.

Application filed February 9, 1916. Serial No. 77,251.

*To all whom it may concern:*

Be it known that I, WILLIAM A. WILEY, a citizen of the United States, residing at Erie, in the county of Erie and State of Pennsylvania, have invented new and useful Improvements in Valves, of which the following is a specification.

This invention relates to valves and consists in certain improvements in the construction thereof as will be hereinafter fully described and pointed out in the claims.

The invention is illustrated in the accompanying drawings as follows:—

Figure 1 is a section on the line 1—1 in Fig. 2.

Fig. 2 a section on the line 2—2 in Fig. 1.

1 marks the valve body. This has the inlet 2 and the outlet 3, the valve here being an angle valve. It will be understood that the invention is applicable to an ordinary globe valve. The body is provided with the usual diaphragm 4 through which extends the valve opening 5. The opening 5 is surrounded with the seat 6.

The valve disk 7 operates to and from the seat 6. It has the guide lugs 8 which engage the guides 9 in the body. The valve, therefore, can move toward and from its seat in an axial direction but is locked against rotation. The upper part of the body has an interiorly screw-threaded opening 10 terminating in a shoulder 11 forming a socket and the bonnet 12 is screwed into this opening.

The valve stem 13 extends through a gland 14 in the upper part of the bonnet. The lower end of the stem is provided with an enlargement 15. The bonnet has a chamber 16 into which this enlargement extends. A screw thread 17 (see dotted lines Fig. 2) extends upwardly from the lower end into the enlarged portion of the stem. The valve is provided with the screw 18 which engages the screw threads in the stem.

The bonnet is provided with a seat 19 surrounding the opening through which the stem extends and the stem is provided with a closure shoulder 20 seating on the seat 19. It will be noted that any pressure in the valve tends to force this closure against this seat and thus prevents leakage around the stem. I prefer, however, to supplement this with the gland 14 so that any possible leakage may be avoided. This is of great importance where valves are used on radiators and similar articles where it is particularly desirable to obviate any leakage.

The shoulder 11 extends inwardly beyond the lower edge of the bonnet and the shoulder 20 overlaps the shoulder 11 and thus locks the stem against movement in a downward direction. The seat 19 locks the stem against movement in an upward direction. By this construction, the stem is free to rotate but is locked against axial movement.

It will be noted that the screw-threaded socket 10 into which the bonnet is screwed is of slightly greater diameter than the shoulder 11 and that the shoulder is a greater distance from the center than the edges of the guides 9 and that the guides 9 are outside of the seat so that all these parts may be machined by a single tool and by a direct axial movement into the valve body.

It will also be noted that with this construction the enlarged stem is in the bonnet. This also facilitates the manufacture and the chamber 16 reduces the weight and also reduces the amount of machining necessary to complete the valve.

What I claim as new is:—

1. In a valve, the combination of a body having a diaphragm and a valve seat thereon, guides extending perpendicularly from the seat and an interiorly screw-threaded bonnet socket having an inwardly extending shoulder at the bottom of the socket, the screw thread, shoulder, guides and seat being in stepped relation, the seat being of smallest diameter; a bonnet screwed into the socket, said bonnet having a seat on its under surface; a valve stem having a shoulder overlapping the shoulder on the valve body and engaging the seat on the bonnet, said stem having a screw thread therein; and a valve operating on the body seat engaging the guides and having a screw thread co-acting with the screw thread in the stem.

2. In a valve, the combination of a body having a diaphragm and a valve seat thereon, said body having a bonnet opening with an inwardly extending shoulder; a bonnet arranged in the opening, said bonnet having a stem opening; a seat surrounding said stem opening, the shoulder on the body extending inwardly from the edge of the bonnet; a valve stem extending through the opening in the bonnet, said stem being provided with a screw thread at its lower end; a seating shoulder on the stem overlapping the shoulder on the body and seating on the seat in the bonnet surrounding the bonnet opening; a valve disk operating toward and from the valve seat locked against rotation; and a screw on the valve disk operating with the screw on the stem for actuating the disk.

3. In a valve, the combination of a body having a diaphragm with a valve opening and surrounding seat; a bonnet opening with an inwardly extending shoulder; a bonnet arranged in the opening in the body, said bonnet having a stem opening; a seat surrounding the stem opening; a chamber above the seat; a gland above the chamber, the inner periphery of the bottom of the bonnet being greater than the inner periphery of the shoulder on the body; a stem extending through the gland, said stem having an enlargement at its lower end extending into said chamber provided with a screw thread; a seating shoulder on the stem operating on the seat on the bonnet, the outer edge of the seating shoulder overlapping the inwardly extending shoulder on the body; a valve disk operating toward and from the seat but locked against rotation; and a screw on the valve disk operating in connection with the screw on the stem.

In testimony whereof I have hereunto set my hand.

WILLIAM A. WILEY.

Copies of this patent may be obtained for five cents each, by addressing the "Commissioner of Patents, Washington, D. C."